Dec. 25, 1962 — J. S. GOLIGHTLY — 3,069,877
METHOD OF BENDING GLASS SHEETS
Filed June 15, 1956 — 4 Sheets-Sheet 1

INVENTOR.
JAMES S. GOLIGHTLY
BY
Oscar L. Spencer
ATTORNEY

INVENTOR.
JAMES S. GOLIGHTLY

Oscar L. Spencer
ATTORNEY

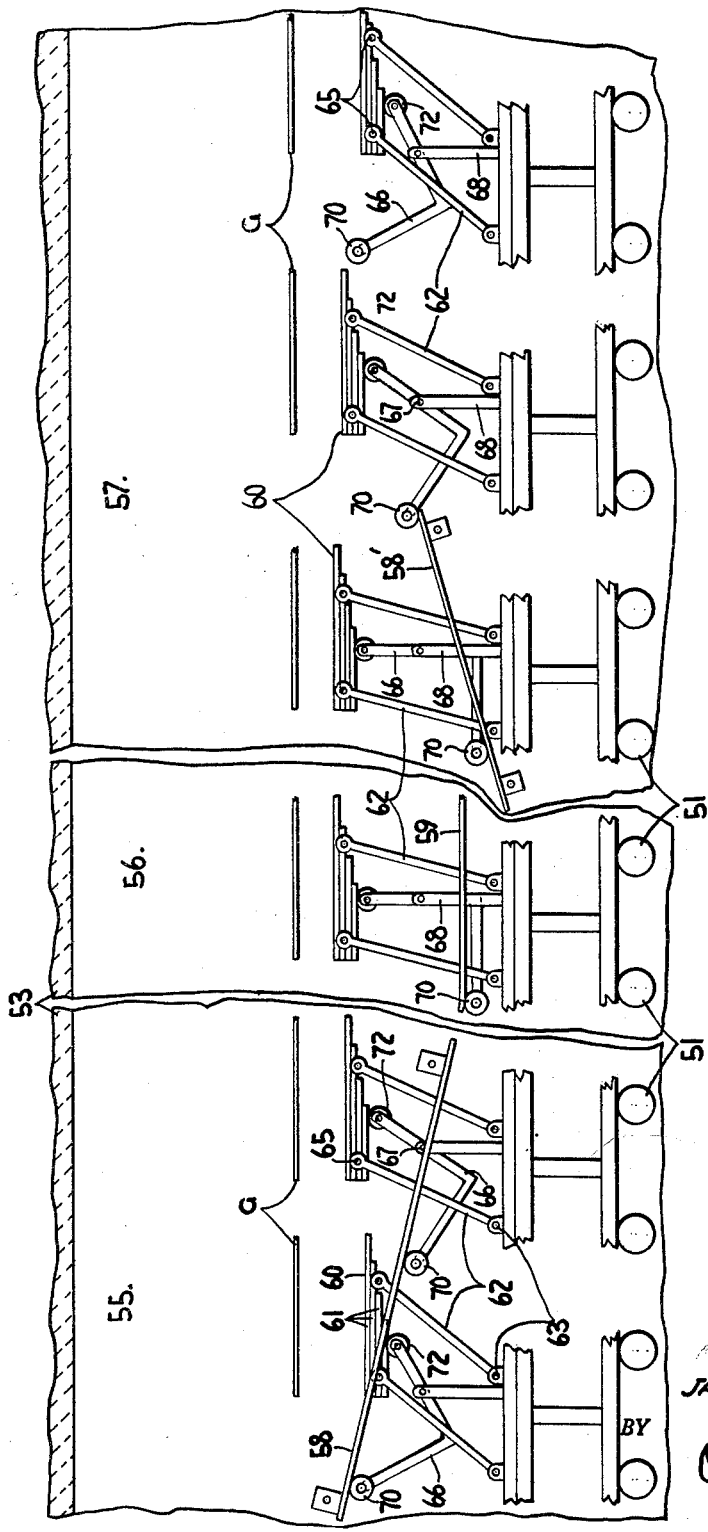

Dec. 25, 1962  J. S. GOLIGHTLY  3,069,877
METHOD OF BENDING GLASS SHEETS
Filed June 15, 1956  4 Sheets-Sheet 4
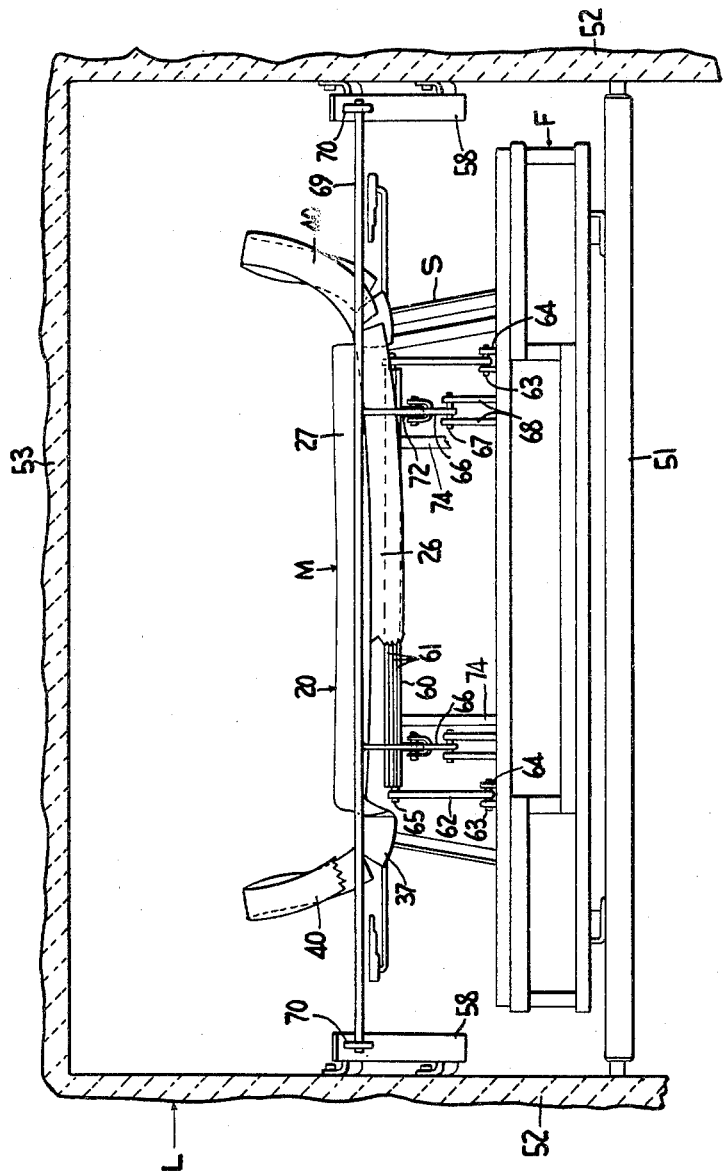
INVENTOR.
JAMES S. GOLIGHTLY
BY
Oscar L. Spencer
ATTORNEY

United States Patent Office 3,069,877
Patented Dec. 25, 1962

3,069,877
METHOD OF BENDING GLASS SHEETS
James S. Golightly, Fox Chapel, Pa., assignor to Pittsburgh Plate Glass Company, County of Allegheny, Pa., a corporation of Pennsylvania
Filed June 15, 1956, Ser. No. 591,694
6 Claims. (Cl. 65—103)

The present invention relates to improvement in bending glass sheets, and particularly concerns the bending of flat glass sheets into complicated shapes having certain relatively flat areas and other areas bent relatively sharply.

It has become the practice in bending "wrap around" windshields from flat glass sheets to convey the sheets laterally on molds through a tunnel like bending lehr having a bending zone in which heating elements are disposed across the path of glass movement to provide a heating pattern having spaced intense regions intersected by the portions of the moving glass that are to be bent sharply and regions of less heat intensity intersecting those regions to be bent less severely. Shields and heat absorbed members have also been used in order to differentiate the heat absorbed by different areas of the glass sheets still further.

In certain bends involving extremely sharp curvatures adjacent gently curved regions, such bending procedures following prior art practices have resulted in setting up thermal stresses in the glass which tend to weaken the bent sheets. When glass sheets are bent into compound curvatures involving bending the sheets both longitudinally into "wrap around" shapes and transversely to provide mutually perpendicular curves of varying radius, these stresses become exceedingly complex and difficult to control.

According to the present invention, thermal shock between flat and curved glass areas in glass sheets bent to complex shapes either longitudinally or both longitudinally and transversely is minimized by utilizing heat abstractor members of either solid metal sheets or expanded metal screens in a novel manner. Molds constructed according to the present invention are provided with a special device to move a heat absorber member relative to a preselected portion of a glass sheet mounted for bending to moderate the temperature rise of the preselected portion for only a portion of the heating interval. Limiting the moderating effect to an interval sufficiently long to prevent the preselected portion from reaching glass softening temperature but sufficiently short to allow the preselected portion to attain a temperature relatively close to that attained by the other glass sheet portions to be bent sharply minimizes internal stresses conducive to thermal shock. The device also moves the heat absorber member relative to said preselected portion as the glass exposure temperature is reduced from the softening point to the annealing range to facilitate uniform cooling of the bent sheet through the annealing range, a factor conducive to establishing a desirable stress pattern in the glass sheet.

The invention will be understood more clearly upon studying the following description of a particular embodiment taken together with the accompanying drawings. In the drawings, wherein the same reference numbers are applied to the same element throughout.

Figure 1:
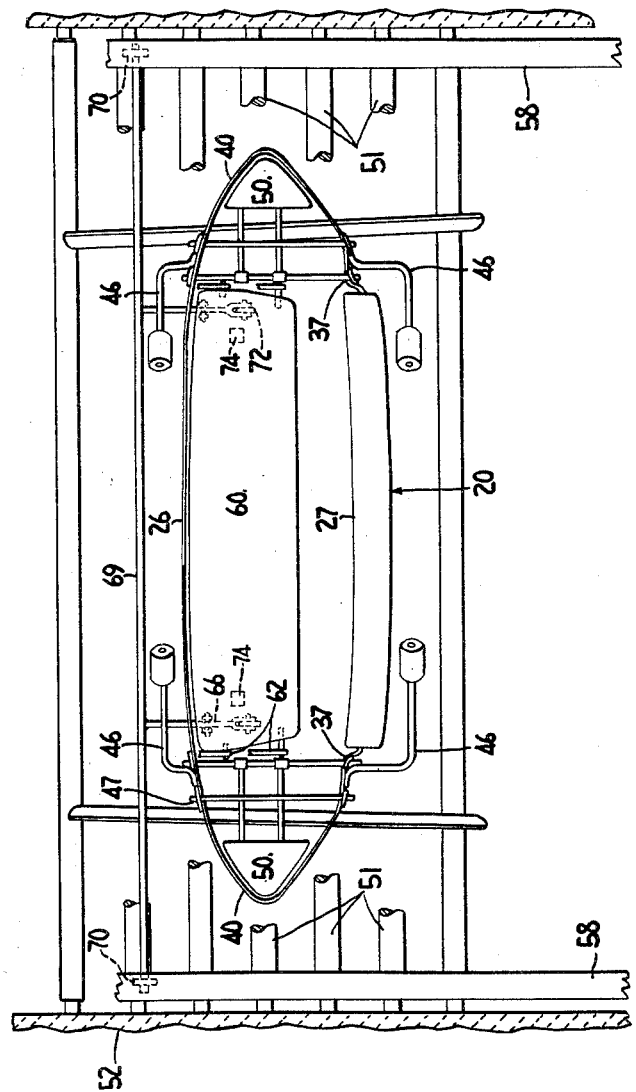
FIGURE 1 is a plan schematic view of a typical mold for bending glass sheets into compound shapes with certain structural details omitted to present the features of the present invention more clearly.
Figure 4:
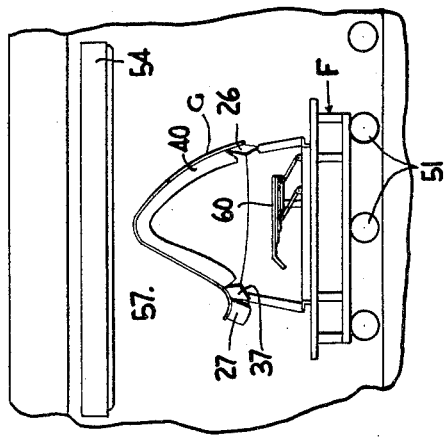
FIGURES 2, 3 and 4 are end views of certain elements of the present invention on a mold such as shown in FIGURE 1 at different stages of a bending lehr, namely, the preheat zone, the bending zone, and the annealing zone, respectively.

FIGURE 5 is a fragmentary longitudinal sectional view of portions of a wall of a bending lehr with certain portions of a glass bending mold and the position assumed by the central laterally extending portion of a glass sheet mounted on the mold for bending superimposed on the drawing to indicate the progress of the bend in various zones of a bending lehr and to indicate the coordination of the actuation of the mold device forming the major portion of the present invention with the bending cycle.

FIGURE 6 is a partial schematic elevation of the bending mold with portions of the mold omitted to show the elements forming the present invention with clarity.

Referring to the drawings, a typical mold for bending glass sheets both longitudinally and transversely is depicted by the reference character M. Mold M is carried on a supporting frame F by means of mold support rods S. Mold M includes a central molding section shown generally at 20 and wing sections 40 at the outboard extremities of the center molding section.

The central molding section 20 includes a smoothly curved side rail 26 fixed to the carrying frame F and extending longitudinally at one side thereof. A smoothly surfaced slide plate 27 flanked by reversely curved rails 37 extends generally parallel to side rail 26 along the other side of central portion 20. Rails 26 and 37 and slide plate 27 all contain upper shaping surfaces shaped to the contour desired for a portion of the bent glass sheet.

Wing sections 40 are provided at each outboard extremity of the central molding section 20. These wing sections are substantially C-shaped or V-shaped in contour depending upon the outline of the glass to be bent. The wing sections contain upper shaping surfaces shaped to the contour desired for the opposing longitudinal extremities of the glass sheet. Counterweighted lever arms 46 are attached to the inboard extremities of the wing sections 40. The lever arms 46 are rotatable about rotational axes disposed laterally of the mold and provided by pivot rods 47. Heat abstractors 50 may be fixed to the supporting frame F to underlie wing sections 40 in cases where the extremities of the bent sheet are to be kept flat.

In bending flat glass sheets to the compound curvatures involving both longitudinal and transverse bends, the wing sections 40 are rotated into an outwardly spread position wherein the flat glass sheet to be bent is supported as a beam upon the outboard longitudinal extremities of the fixed side rail 26 and fixed rails 37 and the lateral outboard extremity of the slide plate 27. The weight of the glass sheet also rests upon the outboard longitudinal extremities of the wing sections 40, thus keeping these members in their outwardly spread position. The glass laden mold is then conveyed through a tunnel-like lehr where the glass is heated to glass softening temperatures. The combination of heat sagging and mechanical force applied through the counterweighted wing sections 40 causes the mold to move into a closed position to form a substantially continuous shaping surface to which the softened glass sheet conforms. The portion of the glass sheet initially resting on the slide plate 27 is permitted to slide on the slide bar as the glass sags transversely, the slide plate being sufficiently wide to compensate for the difference in width between the unbent and bent sheet.

When the curved glass surface includes a relatively flat area, it has been the custom to employ either shields or heat absorber members to moderate the heating in the regions to be kept flat. The description which follows relates to a particular structural embodiment of an improved heat abstractor member, and an actuating device therefor typical of the present invention. This particular device requires a slight modification of bending lehr structure as well as mold structure.

Bending Lehr

A conventional bending lehr L includes a loading station for loading flat glass sheets on a glass bending mold at one end and an unloading station at its other end. The lehr is of tunnel-like configuration extending from the loading station to the unloading station and includes a conveyor comprising conveyor rolls 51. The conveyor serves to convey the glass laden molds through the lehr. The lehr is provided with side walls 52 and a lehr roof 53.

Mounted from the lehr roof are a series of heating elements 54. These heating elements are arranged transversely of the path of movement of the glass laden molds along the conveyor within a preheat zone 55, a bending zone 56 and an annealing zone 57.

Lehrs are adapted for the particular structural embodiment of the present invention by installing an inclined cam rail 58 in each side wall of the preheat zone 55, a horizontal cam rail 59 in each side wall of the bending zone, and an additional inclined cam rail 58' in each side wall of the annealing zone 57. The purpose of these side wall of the annealing zone 57. The purpose of these cams will be better understood after the modification of these molds which form the present invention has been described.

Adjustable Heat Absorber and Actuator

The adjustable heat absorber and actuator which form part of the novel structure of the present invention comprise a heat absorber member 60 which may be composed of a plurality of heat absorber plates 61 mounted in echelon to provide a heat absorber element of varying thickness. As an alternative, screens or expanded metal lamina may be substituted for one or more of the heat absorber plates 61.

The adjustable heat absorber members 60 are carried by pivotable support arms 62. The support arms 62 are apertured at their lower extremities to receive stub bearing rods 63 mounted in bearing brackets 64. The upper extremity of the pivotable support arms 62 are apertured to receive upper stub bearing rods 65 fixed to the adjustable heat absorber member 60.

The modified apparatus also includes spaced angular levers 66 pivoted about pivots 67 supported on brackets 68 that are fixed to the supporting frame F. One end of each angular lever 66 is attached to a cam follower shaft 69. The latter is provided with cam followers 70. The other extremity of the angular lever 66 carries a heat absorber support wheel 72. A stop post 74 is also carried by the support frame F.

Operation of Absorber and Actuator

Figure 2:
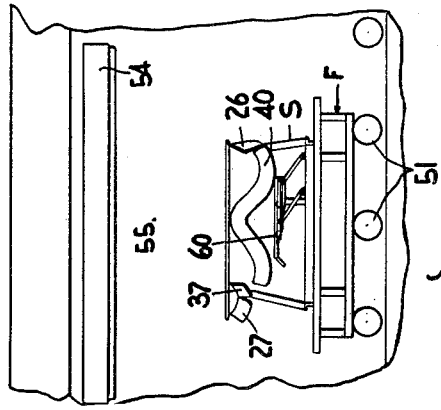

A flat glass sheet G is shown in FIGURE 2 mounted on a typical mold modified according to the present invention as it is passing into the preheat zone before bending has commenced. Note that the precut flat glass sheet is supported upon the spread mold as a beam carried by the longitudinal extremities of the wing sections 40, the longitudinal extremities of the fixed side rail 26, the reversely curved rails 37, and the lateral outboard extremity of the slide 27. The adjustable heat abstractor member 60 is shown resting on the stop post 74 of the mold M. In the loading end of the preheat zone 55, the heat absorber member 60 is maintained the maximum possible distance from the flat glass sheet. Thus, the entire sheet is heated at a substantially uniform rate.

The movable heat absorber 60 and the fixed heat absorbers 50 moderate the temperature increase of the adjacent glass areas immediately thereabove inversely of their distance of separation. As the glass laden mold nears the end of the preheat zone, cam followers 70 engage the inclined cam rails 58, thus causing angular levers 66 to rotate about their pivots 67, thus lifting support wheels 72. The latter force the heat absorber 60 to rise toward the area of the glass sheet under which it is located. The heat abstractor member 60 is thus lifted into close adjacency with the under surface of the central area of the glass sheet which is desired to be maintained relatively flat in the compound shape to be fabricated. This lifting of the heat absorber 60 varies or reduces the distance between the heat absorber or body 60 and the glass sheet area in a direction substantially normal to the undersurface of the glass sheet.

Figure 3:
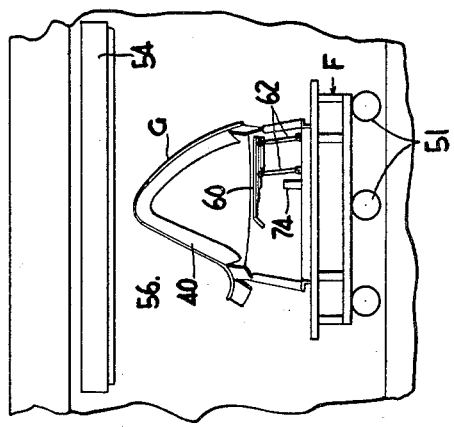

Horizontal cam rails 59 keep the heat absorber 60 raised while the mold passes the bending zone 56. When the glass is subjected to the intense radiation provided by the heating elements 54 in the bending zone, the proximity of the heat absorber plates 61 to the central area to be maintained relatively flat (depicted in FIGURE 3) abstracts a certain portion of the heat radiated onto this area to prevent its softening. At the same time, the other areas of the glass are permitted to be heated until they soften. Therefore, non-uniform bending of the glass sheets occurs in the bending zone.

Glass laden molds are conveyed in succession through the lehr at a speed sufficiently rapid to complete bending those areas of the glass to be bent during passage through bending zone 56 while the area in close proximity to the elevated heat absorber member is maintained relatively flat. While passing through this zone, the molds move into the closed mold position in which the upper shaping surface of rails 28 and 37, slide plate 27 and wing sections 40 form a substantially continuous surface conforming to the desired glass shape.

The molds continue their movement into a section of the lehr where the glass is cooled, either suddenly for tempering or gradually for annealing. In either case, the presence of the heat abstractor member close to the flat area of the glass sheet imparts an undesired stress pattern as the glass cools from approximately its softening point through its annealing range to room temperature. For purposes of illustration, the operation of a bending and annealing lehr is described below.

As each mold M moves into the annealing zone 57 of the lehr L, the cam followers 70 engage inclined cam rails 58' to cause the angular levers 66 to rotate about their pivots 67 thereby lowering the support wheels 72 and enabling the adjustable heat absorber member or body 60 to be lowered relative to the flat area of the glass to increase the distance between the heat absorber or body 60 and the glass sheet area in a direction substantially normal to the undersurface of the glass sheet in the manner shown in FIGURE 5. Displacement of the heat absorber from the glass minimizes the moderating effect upon cooling that would otherwise result in the annealing zone if the heat absorber member 60 were kept close to the flat area of the bent glass sheet. It is important that the heat absorber be withdrawn from the flat area in the region of the lehr where the temperature to which the glass is exposed is dropping from the softening point to the top of the annealing range. For polished plate glass, the softening point is about 1340° F. and the top of the annealing range is about 1030° F. Once the bent glass sheet reaches the lehr region where the temperature is within the annealing range, it is imperative that the heat abstractor 60 be removed as far as possible from the bent glass sheet in order to accelerate cooling of the bent glass and to render as equal as possible the cooling rates of various areas, thus minimizing the establishment of stresses that would occur otherwise because of uneven contraction between the different areas of the bent glass sheet.

For those molds which require the fixed heat absorber plates 50 for maintaining the bent glass extremities relatively stiff, it is noted that the extremities of the bent glass are rotated upwardly upon closing the mold to a position spaced from the fixed heat absorber members 50 a sufficient distance to minimize any deleterious effect of the fixed heat absorbers upon the stress pattern of the cooling glass sheet.

While a specific structure has been disclosed for imparting a compound bend involving bending unbent glass sheets along longitudinal and transverse axes, it is understood that the principles of this invention are equally applicable to imparting shapes to glass sheets wherein certain portions are to be maintained relatively flat and others curved along a single axis of curvature.

The above description of a particular embodiment of the present invention is provided for purposes of illustration rather than limitation. Reference to the latter may be had from the accompanying claims. In the accompanying claims, the terms "substantially flat" and "relatively flat" should be construed as encompassing both flat and gently curved areas of the bent glass sheets or mold shaping surface, but as excluding sharply bent areas.

What is claimed is:

1. In a method of bending glass sheets into non-uniform curvatures including at least one relatively flat region comprising mounting a glass sheet upon a suitable shaping surface of skeleton outline, exposing the glass sheet to a hot atmosphere sufficient to soften the glass sheet to conform to said shaping surface and subsequently cooling the glass sheet below its softening point before removing the bent glass sheet from said shaping surface, wherein softening of said region is retarded by maintaining a body having a relatively high thermal capacity compared to that of an equivalent area of glass in alignment with said region while bending the glass sheet, the improvement comprising varying the distance between said body and said relatively flat region by moving said body in a direction substantially normal to said flat region toward and then away from said flat region during the bending operation while maintaining said body having said relatively high thermal capacity in alignment with said region.

2. In a method of bending glass sheets into non-uniform curvatures including at least one relatively flat region comprising mounting a glass sheet upon a suitable shaping surface of skeleton outline, conveying the glass sheet through a hot atmosphere sufficient to soften the glass sheet to conform to said shaping surface and subsequently conveying the glass sheet through a cool atmosphere to cool the glass sheet below its softening point before removing the bent sheet from said shaping surface, wherein softening of said region is retarded by maintaining a body having a relatively high thermal capacity compared to that of an equivalent area of glass in alignment with said region while bending the glass sheet, the improvement comprising varying the distance between said body and said relatively flat region by moving said body in a direction substantially normal to said flat region toward and then away from said flat region while conveying the glass sheet and said body during the bending operation and maintaining said body having a relatively high thermal capacity in alignment with said region.

3. A method of bending glass sheets into non-uniform curvatures including at least one substantially flat area comprising mounting a glass sheet upon a skeleton shaping surface that conforms in elevation and outline to the shape desired for the bent glass sheet, positioning a heat absorber member in facing relation with said flat area but spaced a relatively large distance therefrom, exposing the glass sheet to gradually increasing temperatures, maintaining said heat absorber member said relatively large distance from said flat area while the glass sheet temperature is increasing but substantially below its softening point, moving said heat absorber member in a direction substantially normal to the surface of the glass sheet into close adjacency to said flat area while the glass sheet is being exposed to increasing tempearturs approaching the glass sheet softening point and before the temperature of exposure reaches the softening point of the glass sheet, continuing to expose the glass sheet to increasing temperatures with the heat absorber member in close adjacency to said area until other areas soften to conform to said skeleton shaping surface, exposing the bent glass to decreasing temperatures immediately upon conforming the sheet to the skeleton shaping surface, increasing the distance between the heat absorber member and the surface of the glass sheet in a direction substantially normal to the surface of the flat area portion while the glass sheet is being cooled, and maintaining said heat absorber member in facing relation with said flat area throughout said bending method.

4. A method of bending glass sheets into non-uniform curvatures including at least one substantially flat area comprising mounting a glass sheet upon a skeleton shaping surface that conforms in elevation and outline to the shape desired for the bent glass sheet, positioning a heat absorber member below said flat area but spaced a relatively large distance therebeneath, exposing the glass sheet to gradually increasing temperatures, maintaining the heat absorber member spaced below said flat area said relatively large distance while the glass sheet temperature is increasing but substantially below its softening point, lifting said heat absorber member in a direction substantially normal to the undersurface of the flat glass sheet into close adjacency to said flat area while the glass sheet is being exposed to increasing temperatures approaching the glass sheet softening point and before the temperature of exposure reaches the softening point of the glass sheet, continuing to expose the glass sheet to increasing temperatures with the heat absorber member in close adjacency to said area until other areas soften to conform to said skeleton shaping surface, exposing the bent glass to decreasing temperatures immediately upon conforming the sheet to the skeleton shaping surface, lowering the heat absorber member from adjacent the undersurface of the glass sheet to increase the vertical distance between the heat absorber member and the surface of the glass sheet in a direction substantially normal to the surface of the flat area portion while the glass sheet is being cooled, and maintaining said heat absorber member in facing relation with said substantially flat area through said bending operation.

5. A method of bending glass sheets into non-uniform curvatures including at least one substantially flat area comprising mounting a glass sheet upon a skeleton shaping surface that conforms in elevation and outline to the shape desired for the bent glass sheet, positioning a heat absorber member in facing relation with said flat area but spaced a relatively large distance therefrom, conveying the glass sheet and said heat absorber member through a first zone whose temperature increases in the direction of glass movement to below said glass softening temperature, maintaining said heat absorber member said relatively large distance from said flat area while the glass sheet and the heat absorber member traverse said first zone, conveying the glass sheet and said heat absorber member through a second zone where the temperature of glass exposure reaches the glass softening point, moving said heat absorber member in a direction substantially normal to the surface of the glass sheet into close adjacency to said area while the glass sheet and the heat absorber member traverse said second zone, thereby preventing the temperature of said area from reaching the glass softening point while other areas soften to conform to the shaping surface, and conveying the glass sheet and said heat absorber member through a third zone of gradually decreasing temperature when the glass sheet conforms to said shaping surface.

6. The method according to claim 5, including moving said heat absorber member away from said area in a direction substantially normal to said area while conveying the bent glass sheet and said heat absorber member through said third zone.

(References on following page)

References Cited in the file of this patent

UNITED STATES PATENTS

| | | |
|---|---|---|
| 1,818,201 | Drake | Aug. 11, 1931 |
| 2,450,297 | Pearse et al. | Sept. 28, 1948 |
| 2,534,523 | McCormick | Dec. 19, 1950 |
| 2,608,030 | Jendrisak | Aug. 26, 1952 |
| 2,646,647 | Bamford et al. | July 28, 1953 |
| 2,663,974 | Thomson | Dec. 29, 1953 |
| 2,688,824 | Badger et al. | Sept. 14, 1954 |
| 2,761,248 | Cowley et al. | Sept. 4, 1956 |
| 2,761,249 | Olson et al. | Sept. 4, 1956 |
| 2,805,520 | Black | Sept. 10, 1957 |
| 2,817,928 | Lambert et al. | Dec. 31, 1957 |

FOREIGN PATENTS

| | | |
|---|---|---|
| 201,464 | Australia | Apr. 4, 1956 |
| 1,113,894 | France | Dec. 12, 1955 |

UNITED STATES PATENT OFFICE
CERTIFICATE OF CORRECTION

Patent No. 3,069,877                      December 25, 1962

James S. Golightly

It is hereby certified that error appears in the above numbered patent requiring correction and that the said Letters Patent should read as corrected below.

Column 3, lines 21 and 22, strike out "The purpose of these side wall of the annealing zone 57.".

Signed and sealed this 14th day of April 1964.

(SEAL)
Attest:

ERNEST W. SWIDER

Attesting Officer

EDWARD J. BRENNER

Commissioner of Patents